3,173,911
PROCESS FOR THE PREPARATION OF PENICILLIN ESTERS

John R. E. Hoover, Glenside, Pa., assignor to Smith Kline & French Laboratories, Philadelphia, Pa., a corporation of Pennsylvania
No Drawing. Filed Oct. 30, 1961, Ser. No. 148,740
5 Claims. (Cl. 260—239.1)

This invention relates to a novel process for the preparation of valuable chemical intermediates and more particularly pertains to a method for synthesizing esters of penicillins.

Known esters of penicillins such as penicillin V and penicillin G have been reported as having a low degree of antimicrobial activity. These compounds are however important intermediates for the preparation of more potent penicillin derivatives. Among the many possible such esters, a particularly valuable one is the benzyl ester. This derivative has the property of being easily reconverted to the free acid by simple hydrogenation. Thus, the lower alkyl esters can be converted to the free acid only by hydrolysis procedures which often lead to undesirable degradation of the fragile penicillin nucleus. The benzyl ester, however, is known to be easily removed by catalytic hydrogenation to yield the free acid.

Heretofore, these benzyl esters have been prepared by treating the particular penicillin as its free acid with phenyldiazomethane. Not only are yields low with such a method, but in addition this reagent is renown as being extremely dangerous especially when employed on a large scale.

According to the novel process of this invention, the particular penicillin starting material in the form of a suitable salt is treated with a benzyl halide such as benzyl bromide in a nonaqueous solvent. This reaction may be represented as follows:

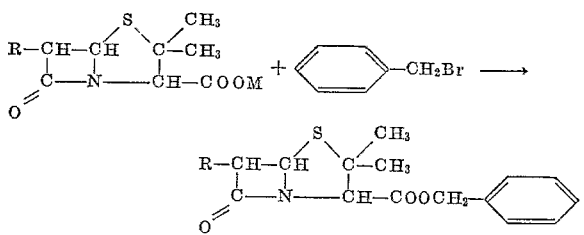

wherein R is a chemically inert penicillin side chain and M is an amine cation or a sodium or potassium cation.

In the above reaction the group R may represent any of the known penicillin side chains which would be uneffected by treatment with benzyl bromide and/or the subsequent hydrogenation. The process is accordingly operative on carboxyamido side chains embracing aryl such as naphthyl and phenyl, including substituted naphthyl and phenyl, e.g., methoxynaphthyl and 2,6-dimethoxyphenyl; alkyl such as pentyl, pentenyl, heptyl and the like; aralkyl such as phenylmethyl; aryloxyalkyl, such as phenoxymethyl, α-phenoxyethyl and the like. It is apparent that the nature of the side chain is relatively unimportant so long as it contains no highly reactive groups such as amino. Suitable penicillins thus include not only the classical penicillins such as G, F, V, dihydro F, K and Flavicidin, but also the more recently available synthetic penicillins such as penethicillin, 2,6-dimethoxyphenyl penicillin and the like.

While the reagent is exemplified above as benzyl bromide, it is apparent that other reactive benzyl halogens such as benzyl iodide or benzyl chloride may alternatively be employed. Similarly, substituted benzyl halides may be employed such as p-methylbenzyl bromide and p-nitrobenzyl bromide. These reagents are relatively equivalent to the unsubstituted benzyl halide and have been found to exhibit little advantage over it.

While the above reaction may be executed at various temperatures, it is generally desirable to employ a temperature in the magnitude of room temperature. Thus not only is the reaction completely operative at this temperature level, but furthermore competitive and degradative side reactions are minimized.

The reaction is preferably executed in a non-aqueous inert polar solvent. Suitable solvents include, for example, dimethylformamide, acetonitrile, dimethylacetamide, nitrobenzene, acetone, dichloroethane, o-nitroanisole and the like.

The resultant benzyl ester may be directly isolated by standard procedures which are more fully described hereafter.

These benzyl esters are then employed as the starting material for the preparation of other valuable penicillin compounds possessing antimicrobial activity, as for example, the penicillin sulfoxides and sulfones, which are described in copending application Serial No. 148,711, filed October 30, 1961. According to the processes described therein, the benzyl ester of a penicillin is treated with a suitable oxidizing agent, such as potassium permanganate or sodium iodate to yield the sulfoxides or sulfones as the benzyl esters. These compounds may then be converted to the corresponding free acids by hydrogenoylsis as for example with palladium-on-carbon.

The following examples will serve to further typify the nature of these inventions but these examples should not be construed as limiting the scope of this invention, the scope being defined solely by the appended claims.

Example 1

To 250 ml. of freshly distilled dimethyl acetamide is added 48.3 g. of dihydro penicillin F as the sodium salt followed by 24.9 g. of freshly distilled benzyl bromide. The mixture is stirred at room temperature for 100 minutes and then filtered. The filtrate so obtained is then poured into 800 ml. of ice water. The oil which forms is separated, washed with ether, washed with dilute aqueous sodium bicarbonate and dried over anhydrous sodium sulfate. The dried solution is next poured into excess petroleum ether and the oil which separates taken up in ether. This ethereal solution is dried over sodium sulfate and then evaporated to yield the benzyl ester of dihydropenicillin F.

Example 2

A suspension of 111.6 g. (0.3 mole) of penicillin G potassium salt in 500 ml. of freshly distilled dimethylformamide and 59.8 g. (0.35 mole) of freshly distilled benzyl bromide is stirred at room temperature for 90 minutes. The mixture is then filtered and the filtrate poured into 1.5 liters of ice water. The resulting oil is extracted with ether, washed with aqueous sodium bicarbonate and dried over anhydrous sodium sulfate. The dried solution is next poured into excess petroleum ether and the oil which separates taken up in ether and again dried over sodium sulfate. Evaporation of the ether filtrate in vacuo yields the benzylpenicillin benzyl ester as a syrup. This product may be employed in this form or further purified by dissolving in ether, washing the ethereal solution with dilute aqueous sodium bicarbonate, drying the ethereal solution, and evaporating the solvent.

Example 3

Using the procedure of Example 2, 13.2 g. (0.038 mole) of phenoxymethylpenicillin as the potassium salt is treated with 6.5 g. (0.038 mole) of benzyl bromide in 500 ml. of dimethylformamide to yield after 3 hours, phenoxymethylpenicillin benzyl ester as a pale yellow oil.

Example 4

The following penicillins are substituted in equivalent quantities for penicillin G in the procedure of Example 2:

Phenethicillin triethylamine salt
2,6-dimethoxyphenylpenicillin potassium salt
Penicillin F sodium salt
Penicillin K potassium salt There are thus prepared the compounds:

Penethicillin benzyl ester
2,6-dimethoxyphenylpenicillin benzyl ester
Penicillin K benzyl ester
Penicillin F benzyl ester

I claim:

1. The process of preparing benzyl esters of penicillins which comprises treating a penicillin of the formula:

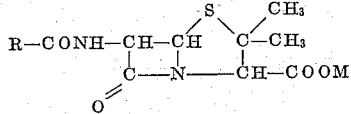

wherein R is a penicillin side chain selected from the group consisting of lower alkyl, lower alkenyl, phenyl lower alkyl and phenoxy lower alkyl and M is a cation selected from the group consisting of sodium, potassium and lower alkyl amine, with a benzyl halide in a nonaqueous inert polar organic solvent.

2. The process according to claim 1 wherein the benzyl halide is a benzyl bromide.

3. The process according to claim 2 wherein the nonaqueous inert polar organic solvent is dimethylformamide.

4. The process according to claim 2 wherein R is phenylmethyl.

5. The process according to claim 2 wherein R is phenoxymethyl.

References Cited in the file of this patent

UNITED STATES PATENTS 2,754,297  Sheehan et al. _____ July 10, 1956